Figures 1, 2, 3:
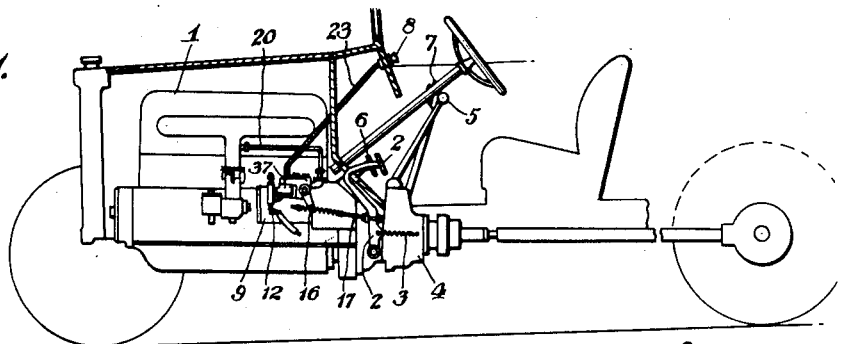

Dec. 11, 1934.  J. GOOD  1,983,849

ENGINE STARTING SYSTEM

Original Filed Dec. 4, 1926  2 Sheets-Sheet 1

Inventor:
John Good
By Jeffrey Kimball & Eggleston
Attys.

Dec. 11, 1934.  J. GOOD  1,983,849
ENGINE STARTING SYSTEM
Original Filed Dec. 4, 1926  2 Sheets-Sheet 2
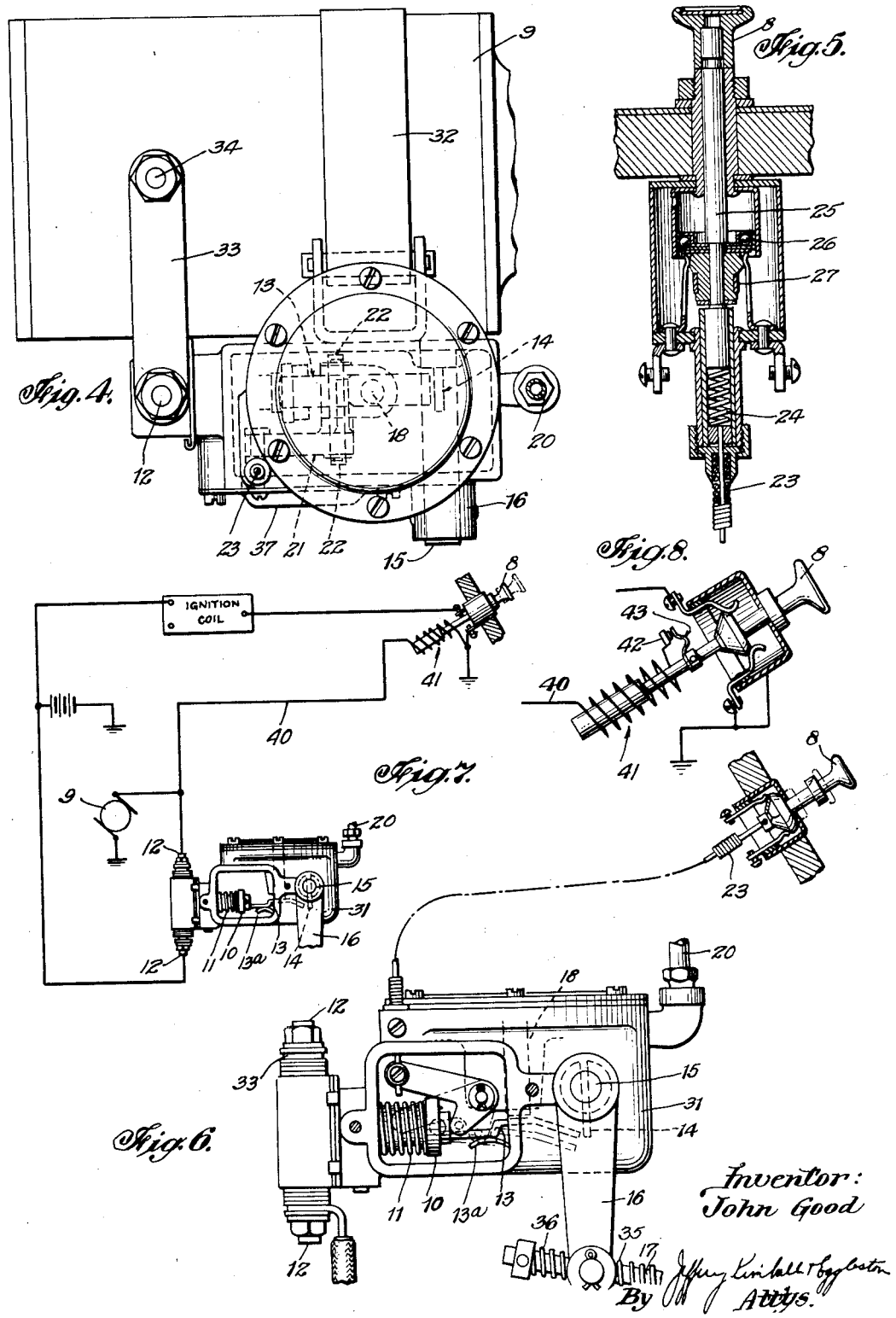

Patented Dec. 11, 1934

1,983,849

UNITED STATES PATENT OFFICE 1,983,849

ENGINE STARTING SYSTEM

John Good, Garden City, N. Y., assignor to Automatic Motor Stop and Start, Inc., New York, N. Y., a corporation of New York Application December 4, 1926, Serial No. 152,535
Renewed May 25, 1933

20 Claims. (Cl. 290—28)

The invention relates to systems for simplifying the operation of starting automobile engines whereby various advantages are obtained as below made apparent, and more particularly to certain improvements in the system jointly invented by myself and Malcolm Stevenson and shown in application No. 146,822, filed November 6, 1926, said improvements relating to the coordination of the engine ignition means with the apparatus incorporating said joint inventions and to other features pointed out in the subjoined claims.

In the drawings

Figure 1 shows a conventional automobile having the invention applied.

Figure 2 a larger scale elevation of the starting switch connections and the ignition switch, including the circuits in diagram.

Figure 3 a vertical section of Fig. 2.

Figure 4 a plan thereof.

Figure 5 a modification of the ignition switch.

Figure 6 a modification of the ignition control, and

Figures 7 and 8, further modifications.

Referring to Figures 1 to 4, the automobile shown comprises a suitable propelling engine with the usual power transmission line including a clutch, change-gear set, and propeller-shaft connected to the rear wheels, all as usual. The clutch proper does not appear in the drawings but will be understood to be opened by depressing the driver's clutch pedal 2 and closed by allowing it to return to its usual position under the influence of a suitable clutch-spring, such as 3. The change-gear set 4 is controlled by the usual gear shift lever 5, to change the drive ratio of the engine on the propeller shaft. The clutch pedal 2 and the gear shift lever 5 are both operator's control members used by the driver for controlling the motion of the car. The usual brake pedal 6 and the emergency hand brake lever at 7 are also shown, these being other operator's control members, as will be understood. The ignition system is only partly illustrated in Fig. 2 but may be assumed to comprise any conventional circuit which may be controlled by a manual switch, such as indicated at 8 and which is commonly mounted on the instrument board. The particular form of switch shown is closed when pulled outwardly, but there is no limitation to any particular type or location of the ignition switch, except that it is desirably located near the operator.

The engine has a starting or cranking device in the form of an electric motor 9, shown of the type which automatically engages with teeth on the engine flywheel to crank the engine, but other types can also be used with appropriate modification, including those in which the motor, when driven by an engine becomes the generator for supplying ignition and charging the storage battery, and those in which the motor is manually engaged with the flywheel or with the engine on starting, etc. The circuit for the cranking motor, of whatever type, includes an operating member, or starting switch, which in the common automobile, is in the form of a foot-operated button or plunger projecting through the floor board where the operator can reach it. The process of starting the engine of such an automobile requires that the ignition switch be closed and that the power transmission line be opened, either by opening the clutch or by putting the gear lever in neutral position thus to disconnect the engine from the vehicle wheels, before pressing the starting button. In many cases it also requires the brakes to be set to keep the car from moving when thus disconnected and some degree of skill is required for properly manipulating all these members, especially when the car is on an incline, or when the engine is stalled in traffic. The difficulty is largely due to the fact that it is inconvenient to remove either foot from a foot pedal in order to press the starting button.

By the present invention one of the normal control members of the automobile, and preferably the clutch pedal 2, is arranged to do the work of the starting button so that the engine can be started without special attention or effort by the operator and without interfering with the normal function of the control member used, thereby enabling him to start the engine and automobile very promptly under all conditions. The mechanism requisite for this improvement in operation affords other advantages as will appear below, tending to simplify the construction and avoid waste of current.

Referring to Fig. 3, the starting switch for the cranking motor 9 is closed by movement of the plunger contact 10 against the pressure of the spring 11, which connects the two terminals 12 of the starting circuit, thus energizing the motor and in the present case causing it to engage automatically with the flywheel and revolve the latter as usual and as above stated. The switch contact member 10 is moved by the action or partial action of one of the control members normally used by the operator in driving the car, desirably by one of the two members which are used to open or interrupt the power transmission line to the vehicle wheels and preferably by the clutch pedal 2. The use of either the clutch pedal or the gear shift lever for the operation of the starting switch, insures that the engine will be free of the vehicle load when being cranked. The plunger contact member 10 carries a latch 13 adapted to be engaged by the short crank arm 14 of a rock shaft 15, the other arm 16 of which is operated by a rod 17 connecting it to the clutch pedal 2, so that depression of the latter may thus close the starting circuit. One of the connecting elements between the pedal and the switch is arranged to be effective or ineffective for transmitting the pedal motion, according as the engine is dead or running, and in the present case, the latch 13 is such selector element being for this purpose hinged to the rear end of the switch plunger 10 and urged to its effective position by a spring 13a and movable from that position to its other position by the downward action of the stem 18 of a diaphragm 19 or equivalent device. The diaphragm is subject to the suction effect in the engine intake, through a tube connection 20, so that when the engine is running on its own combustion or at a speed at which stalling is not possible and which may be termed the normal running condition, the intake suction acting through the diaphragm stem 18 pushes the connecting member 13 out of engagement with, or out of the range of, the crank arm 14. In the one position in which the engine is dead, the control member 2 may close the starting switch; in the other, which coincides with a normally running engine, it has no effect on the cranking device, but in both cases is available for its normal use by the operator. The parts shown can be arranged so that the pedal can be used to hold the switch closed as long as desired, but preferably the design is such that as soon as the engine begins to fire the diaphragm stem 18 immediately kicks the connector out of contact with the crank member 14, thus tending to save starting current. The suction-governed connector constitutes the preferred but not the only means whereby the speed condition of the engine may govern the use of the operator's control member for the extra function of energizing the cranking device; other fluid media normally present in the engine might be used, including the electric current generated by the engine for charging the battery, since all that is necessary is to impart a change of position or condition of some part of the operating line between the control member and the cranking device. The foregoing refers to the subject of the joint application above mentioned.

As further aid to the starting of the engine, the present invention includes means whereby the actuation of the cranking device in the manner described may also close the ignition circuit, thus relieving the operator of the necessity of manually performing that act and saving time accordingly. For this purpose the bell crank 21, pivoted on a stud 22, has its shorter arm arranged to be engaged by a shoulder on the connector element 13 so as to be rocked on its pivot when the starting switch is closed. This bell crank movement is transmitted through a Bowden wire 23 or other transmitting connection to the stem of the ignition switch 8 so as to close it, i. e., push it out to its closed position. It is generally sufficient if such closure occurs simultaneously with the closing of the starting circuit, but a slight delay of ignition is preferable and can be accomplished by introducing a dash-pot or the like in the Bowden wire connection, as shown, for example, in Fig. 5. Here the Bowden wire 23 acts to compress a spring 24 and through the latter moves the stem 25 of the switch button 8, but only at the rate permitted by the dash pot plunger 26, thus causing the switch to close a moment after the starting switch and when the engine is turning over. The ignition switch will be understood from the drawings; the circuit is closed by the spring fingers which snap against the insulated metal ring 27.

Whether or not provided with a retarding device, the ignition switch may be located elsewhere than on the instrument board, but in that position it is easily accessible to the operator for stopping the engine, or for manual closure when preferred. Inasmuch as the engine can be started by the simple depression of a pedal, and without performing any motions not employed while the car is in motion, it becomes practical and also convenient for the operator to follow the practice of stopping his engine (by touching the convenient ignition switch) whenever he stops the car, as for example, on making traffic stops, thus accomplishing much economy in energy and engine wear. The next depression of the clutch pedal restarts the engine, the power transmission line being then open, as it should be, and the engine is thus running and ready for propelling the car as soon as the pedal is returned.

Referring to Fig. 6, the construction is identical with Fig. 3, except that the ignition bell cal with Fig. 3, except that the ignition bell crank, here marked 30, is out of the path of the shoulder on the connector element 13 and therefore not moved by the pedal when the latter is used for cranking the engine. In this form, the ignition switch controls the connector element. When the switch is opened, i. e., button 8 pressed down, the lower arm of the bell crank 30 depresses the connector element 13 against its spring so as thus to prevent or block closure of the starting circuit by use of the clutch pedal. When the ignition switch is closed, the connector element resumes its effective position in the range of the crank 14, staying there until displaced by the action of the engine-governed member 18 as before. In this form the cranking device cannot be used unless the ignition system is turned on.

The several parts above described, except the ignition switch, are contained in a suitable casing 31 which can be variously designed and variously located on the engine or otherwise, so as to be convenient to the pedal which operates it. In the present case, it is strapped by a band 32, Fig. 4, to the casing of the starting motor 9, in which position the live terminal 12 of the starting switch is close to the motor terminal 34 and can be connected to it by a short copper strap 33, the cover of the diaphragm chamber being thus easily accessible. In any position of the casing, the operating crank arm 16 is desirably engaged to the connecting rod 17 through the intervention of springs, such as 35 and 36, which serve to protect the electric switch or switches from excessive pressure and at the same time avoid interference with the normal position of the clutch pedal. The spring 35 and also the spring of plunger 10 serves a further function in that their tension, added to the tension of the clutch spring or springs imposes a further resistance which the operator must overcome when starting the engine, thus indicating to him that the clutch pedal is about to close the starting circuit.

The enclosing casing 31 is provided with a removable cover 37 (Fig. 2) to give access to the interior and the bell crank connection to the Bowden wire so that the apparatus can readily be installed on different types of cars.

The modification of Fig. 7 shows an electric substitute for the Bowden wire in the preceding figures, all the other mechanism remaining as first described. In this form, the circuit wire 40 is arranged to connect the battery, through starting switch 11, to a solenoid 41 the core of which is arranged to move the switch plunger to its closed-switch position, thus energizing the ignition system practically at the same time the cranking circuit is closed. In Fig. 7 the solenoid circuit is completed direct through a permanent ground, but in Fig. 8 it includes a circuit breaker composing the two contact points 42 and 43, the former of which is stationary and the other yieldingly fixed to the switch plunger, which is grounded to the switch casing. By means of this circuit breaker, the switch is actuated (closed) by the first rush of current, and the solenoid circuit is immediately opened as soon as it is closed, thus obviously saving current.

I claim:

1. In an automobile, an operating member and an engine cranking device, in combination with a selector element adapted to control the effect of the former on the latter, means whereby the condition of the engine controls said selector element, and an ignition switch operatively associated with said element.

2. In an automobile, the combination of a propelling engine, an engine cranking device and an operating member therefor, engine operated means for controlling the effect of said member on the said device, an ignition circuit, a control therefor operatively associated with said engine-operated means, and a manual member operable to control the ignition circuit independently of said operating member and engine-operated means.

3. In an automobile, the combination of a propelling engine, a fuel intake thereto, an engine cranking device and an operating member therefor, means adjustable to control the effect of the said member on the said device, said means connected to the engine intake for operation by the suction therein, and an ignition switch operatively associated with said means.

4. In an automobile, the combination of a propelling engine, a cranking device therefor, an ignition switch, a control member adapted to cause actuation of said device and also said switch, and manual means for operating said switch independently of the control member.

5. In an automobile starting system the combination with a starting motor and an ignition circuit, of an operator's control operable to break said circuit and a second operator's control operable to coincidently energize the ignition circuit and the starting motor independently of the setting of said first control.

6. In an automobile starting system the combination with a starting motor and an ignition circuit, of two operator's controls each operable to energize said circuit, one of said controls operable also to de-energize the same and the other of said controls adapted to render active the starting motor coincidently with the energization of the ignition circuit independently of the setting of the other control.

7. In an automobile, the combination of a propelling engine, an ignition circuit, a switch manually movable to break said circuit and stop the engine, an engine cranking device, and an operator's control member adapted to close the ignition circuit and to cause said device to crank the engine independently of the manual setting of said ignition switch, said member being ineffective to open said circuit.

8. In an automobile, the combination of the driving wheels, a propelling engine, an ignition switch, a cranking motor, an operator's control member adapted by movement in one direction to connect the engine and driving wheels and in the opposite direction to cause actuation of said switch and motor for starting the engine and means governed by the normal running of the engine for rendering said member inoperative to cause actuation of said motor.

9. In an automobile starting system, the combination of a cranking motor, an ignition circuit, a switch manually operable to break said circuit, an operator's control member adapted to energize said cranking motor and means responsive to the actuation of said control member to return said switch to its circuit closing position.

10. In an automobile, the combination of a propelling engine, an engine cranking motor, control means therefor including a motor circuit, a switch in said circuit, an operating member for the switch and selector means adjustable to control the effect of said member on said switch, an ignition circuit and switch mechanism therefor including a manually operable member and an element operatively associated with said cranking motor control means.

11. In an automobile, the combination of a propelling engine, a fuel intake thereto, an engine cranking motor, control means therefor including a motor circuit, a switch, an operating member for the switch, and selector means adjustable to control the effect of said member on said switch, said selector means connected to the intake for operation by the suction therein, an ignition circuit and switch mechanism therefor including a manually operable member and an element operatively associated with said control means for the cranking motor.

12. In an automobile, the combination of a propelling engine, a cranking device therefor, an ignition circuit, a switch therein and a solenoid for actuating the switch to close a gap in said circuit and an operator's control member arranged to coincidently energize said cranking device and said solenoid, said member being ineffective to open said ignition circuit and manual means for operating said ignition switch independently of the control member.

13. In an automobile, the combination of a propelling engine, a cranking motor, a circuit therefor, an ignition circuit, a switch therein and a solenoid for actuating the switch to initially complete the ignition circuit, a circuit for the solenoid, and a manually operated switch arranged to coincidently close said cranking motor and solenoid circuits, said ignition switch having means to maintain it in its closed position independently of said manually operated switch.

14. In an automobile, the combination of a propelling engine, a cranking motor, a circuit therefor, an ignition circuit, a switch therein and a solenoid for actuating the switch to complete the ignition circuit, a circuit for the solenoid, a manual control member movable in one direction to cause energization of said cranking motor and solenoid circuits, the latter coincidently closing the ignition switch, and in the reverse direction to deenergize said circuits, and means for holding said ignition circuit switch in its closed position following actuation thereof by and independently of said solenoid.

15. In an automobile, the combination of a propelling engine, a cranking motor and a circuit therefor, an ignition circuit, a manual switch operable to open and close a gap in said ignition circuit, a solenoid arranged when energized to move said switch to close said gap independently of its manual setting, and an operator's control member adapted to coincidently energize said cranking motor circuit and said solenoid.

16. In an automobile, the combination of a propelling engine, a cranking device therefor, an ignition switch, a control member adapted to cause actuation of said device and also, after an interval, of said switch, and manual means for operating said switch independently of the control member.

17. In an automobile, the combination of a propelling engine, an ignition circuit, a switch manually movable to break said circuit and stop the engine, an engine cranking device, an operator's control member adapted to cause said device to crank the engine, and connections whereby said member also closes the ignition circuit, independently of the manual setting of said ignition switch, said connections including means for delaying the closure of said circuit until after the actuation of said device.

18. In an automobile, the combination of a propelling engine, a cranking device therefor, an ignition switch, electro-magnetic means adapted when energized to close said switch and an operator's control member arranged to coincidently energize and coincidently de-energize said device and means, and means for maintaining said switch closed independently of the electro-magnetic means after it has been closed thereby.

19. In an automobile, the combination of an engine, a cranking device, a control member, a selector element movable into one position to permit and into another position to prevent actuation of said device by said member, an ignition switch and means controlled thereby arranged to move said element to its first-mentioned position coincidently with the closure of said switch.

20. In an automobile, the combination of an engine, a cranking device, a control member, a selector element movable into one position to permit and into another position to prevent actuation of said device by said member, an ignition switch, means actuated thereby upon closure of the switch to cause said element to move to its first-mentioned position and engine-operated means arranged to move said element to its second-mentioned position.

JOHN GOOD.